(12) United States Patent
Ward

(10) Patent No.: US 6,674,294 B2
(45) Date of Patent: Jan. 6, 2004

(54) DRIVE FEEDTHROUGH NULLING SYSTEM

(75) Inventor: Paul Ward, Roslindale, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 0 days.

(21) Appl. No.: 10/232,278

(22) Filed: Aug. 30, 2002

(65) Prior Publication Data

US 2003/0011385 A1 Jan. 16, 2003

Related U.S. Application Data

(62) Division of application No. 09/631,249, filed on Aug. 2, 2000, now Pat. No. 6,445,195.

(51) Int. Cl.[7] .............................................. G01P 9/04
(52) U.S. Cl. ................. 324/684; 324/687; 324/684; 324/690; 324/658; 324/659; 324/667; 324/668; 324/669
(58) Field of Search .................. 73/514.16, 514.38, 73/504.03, 504.12, 504.04, 504.16; 702/190; 324/687, 684, 690, 658, 659, 667, 668, 669, 674, 679

(56) References Cited

U.S. PATENT DOCUMENTS

| 5,329,815 A | 7/1994 | Dunn et al. |
| 5,349,855 A | 9/1994 | Bernstein et al. |
| 5,481,914 A | 1/1996 | Ward ...................... 73/504.16 |
| 5,576,976 A | 11/1996 | White |
| 5,600,064 A | 2/1997 | Ward |
| 5,604,309 A | 2/1997 | Ward |
| 5,608,351 A | 3/1997 | Ward |
| 5,672,949 A | 9/1997 | Ward |
| 5,703,292 A | 12/1997 | Ward |
| 5,747,961 A | 5/1998 | Ward et al. |
| 5,952,572 A | 9/1999 | Yamashita et al. ......... 73/504.12 |
| 5,992,233 A | * 11/1999 | Clark ...................... 73/514.35 |
| 6,035,694 A | 3/2000 | Dupuie et al. |
| 6,119,518 A | 9/2000 | Itou et al. |

\* cited by examiner

Primary Examiner—N. Le
Assistant Examiner—Vincent Q. Nguyen
(74) Attorney, Agent, or Firm—McDermott, Will & Emery

(57) ABSTRACT

The present invention relates to a system for nulling drive feedthrough error in a sensor having first and second drive electrodes which impart vibratory motion to first and second proof masses in response to first and second opposite phase drive signals, and having first and second capacitances defined between the drive electrodes and their associated proof masses. A mismatch between the first and the second capacitance is measured. Drive feedthrough caused by the measured capacitance mismatch is nulled by adjusting the relative amplitudes of the first and second opposite phase drive signals, whereby the ratio of the amplitudes is proportional to the ratio of the first and second capacitances. A servo loop may adaptively effect the ratio of amplitudes.

6 Claims, 4 Drawing Sheets

DRIVE FEEDTHROUGH NULLING SYSTEM

CROSS-REFERENCE TO RELATED APPLICATIONS

This application is a divisional application of U.S. patent application Ser. No. 09/631,249, entitled DRIVE FEEDTHROUGH NULLING SYSTEM and filed Aug. 2, 2000 now U.S. Pat. No. 6,445,195.

STATEMENT REGARDING FEDERALLY SPONSORED RESEARCH

Not Applicable

REFERENCE TO MICROFICHE APPENDIX

Not Applicable

FIELD OF THE INVENTION

This invention relates generally to feedthrough nulling systems, and more particularly to systems for nulling drive signal feedthrough in sensors.

BACKGROUND OF THE INVENTION

Coriolis force sensors such as tuning-fork gyroscopes are known in the art. These sensors can be fabricated using MEMS (microelectromechanical systems) techniques, by way of example. Micromachined Coriolis force sensors generally include a pair of proof masses which are positioned on opposite sides of an input axis, and which are connected to a substrate by support flexures. The flexures support the proof masses so as to allow the proof masses to vibrate in a nominal plane that includes the input axis. Time varying drive signals are provided by way of drive electrodes to impart an in-plane, anti-parallel vibratory motion to the proof masses. Typically, the frequency of the drive signals is set at or near the mechanical resonant frequency of the sensor assembly.

Position sensitive in-plane pick-off electrodes are usually provided for sensing in-plane displacements of the proof masses caused by the vibratory motion. The pick-off electrodes are coupled to a feedback gain control circuit, which controls the amplitude of the drive signals, and thus the amplitude of vibration of the proof masses. For stable and predictable gyroscope performance, the amplitude of vibration of the proof masses is preferably maintained at a predetermined, constant level.

Upon rotation of the sensor assembly about the input axis, the vibrating proof masses produce anti-parallel, out-of-plane deflections, caused by Coriolis forces which arise in response to the rotation. Out-of-plane sensing electrodes are provided in order to detect the out-of-plane deflections. Due to the nature of the Coriolis force, whose magnitude depends on the rotational rate of the sensor assembly, the amplitudes of the Coriolis deflections are proportional to the rotational rate of the sensor about the input axis. The sensing electrodes thus generate a signal indicative of the rotational rate of the gyroscope.

The performance of sensors such as the tuning fork gyroscope discussed above is adversely affected by a feedthrough of the drive signals into the sensor output, resulting from a coupling of signals from the drive electrodes into the out-of-plane sensing electrodes. Drive feedthrough affects measurements by both the out-of-plane sensing electrodes and the in-plane pick-off electrodes, thus limiting gyroscope performance.

It is an object of this invention to provide a system for significantly reducing drive feedthrough, thereby improving sensor performance.

SUMMARY OF THE INVENTION

The present invention relates to a system for nulling drive feedthrough error in sensors such as tuning fork gyroscopes. By reducing the undesirable effects of drive feedthrough, the present invention reduces one of the largest electronic sources of error in tuning fork gyroscopes. Further, the technique of the present invention has general applicability, and can be used to null other forms of drive feedthrough.

In one embodiment, the present invention relates to a system for nulling feedthrough error in a sensor having first and second drive electrodes which impart vibratory motion to first and second proof masses in response to first and second opposite phase drive signals, and having capacitances defined between the drive electrodes and their associated proof masses. The present invention is predicated in part on the recognition that capacitance mismatch between the drive electrodes and the associated proof masses is a dominant cause of drive feedthrough in Coriolis force sensors.

In accordance with the present invention, a differential drive amplitude is adjusted in order to compensate for drive capacitance mismatch. Compensation is accomplished by measuring the capacitance mismatch between the first and second drive electrodes and their associated proof masses, and nulling the measured capacitance mismatch by adjusting the drive signals. The capacitance mismatch can be measured by detecting signals that are proportional to the capacitance mismatch. In one embodiment, an off-frequency artifact is detected in order to obtain a measure of the drive capacitance mismatch.

In accordance with the present invention, a sensor for detecting a rotational rate about an input axis includes a substrate, and first and second proof masses positioned on opposite sides of an input axis. The proof masses are flexurally coupled to the substrate so as to permit an in-plane vibratory motion of the masses in a nominal plane including the input axis, and an out-of-plane vibratory motion in a direction perpendicular to the nominal plane. Each proof mass includes a electronically conductive region.

A driver includes first and second drive electrodes opposite the electrically conductive regions of the first and second proof masses. First and second capacitances are defined between the first drive electrode and the first proof mass, and between the second drive electrode and the second proof mass, respectively. The first and second drive electrodes are adapted to receive first and second a.c. opposite phase electrical drive signals for electrostatically driving the first and second proof masses to effect the anti-parallel vibration in the nominal plane. The frequency of the drive signals is preferably set to be substantially equal to a fundamental frequency corresponding to a mechanical resonant frequency of the sensor.

First and second sensing electrodes are provided for detecting the out of plane vibratory motion perpendicular to the nominal plane, arising from the Coriolis force that acts upon the proof masses when the sensor assembly rotates about the input axis. Each sensing electrode is fixedly positioned with respect to the substrate, and is disposed opposite the conductive region on a respective one of the first and second proof masses. The sensor is preferably micromachined, i.e. the proof masses, the drive electrodes, and the sensing electrodes are made from an etched silicon structure.

A circuit generates an output signal corresponding to the separation between the sensing electrodes and the conductive regions of the proof masses opposite. The output signal is representative of the rotational rate of the sensor about the input axis. Means are provided for adjusting the relative amplitudes of the first and second a.c. drive signals, whereby the ratio of the amplitudes is proportional to the ratio of the first and second capacitances. The adjustment of relative amplitudes of the drive signals substantially nulls drive feedthrough in the output signal caused by a mismatch in the first and second capacitances. In particular, when the drive signals have opposite polarities, and have a magnitude ratio equal to the reciprocal of the ratio of the corresponding capacitances, drive feedthrough from drive capacitance mismatch is substantially nulled.

The circuit may include first and second circuits. The first circuit is operative to provide an indicative signal proportional to a capacitance mismatch between the first and second capacitances. The second circuit is operative to measure the capacitance mismatch using the indicative signal, and to compensate for the measured capacitance mismatch by adjusting the first and second drive signals so as to substantially null drive feedthrough.

The first circuit may include a sense preamplifier connected to the proof masses. The output from the sense preamplifier contains a signal that is indicative of the mismatch between the first and second capacitances. The indicative signal can be demodulated in the second circuit to obtain a measure of the drive capacitance mismatch. The indicative signal may be a separate tracer signal that has been added to the drive signals. Alternatively, the indicative signal may be an inherent off-frequency component of the drive signal, in which the sensor resonant frequency and its harmonics have been suppressed.

The second circuit may include an adjustment device responsive to a controller for effecting the ratio of amplitudes, and a servo loop for adaptively effecting the ratio of amplitudes. In one embodiment, the adjustment device includes first and second variable gain amplifiers (VGAs) interposed between the servo loop and the first and second drive electrodes. The VGAs are operative to adjust the differential amplitude of the drive signals in response to the controller.

The second circuit may include means for demodulating the indicative signal from the first circuit so as to obtain a DC signal proportional to the capacitance mismatch. In one embodiment, the means for demodulating the indicative signal may include a multiplier, a low pass filter for removing modulation components from the indicative signal, and a controller. The demodulated signal may be passed through the controller to provide a control signal. The control signal may be split into first and second control signals of opposite phase, which control the first and second VGAs, respectively.

The present invention also relates to a method for nulling drive feedthrough in a sensor having first and second drive electrodes which impart vibratory motion to first and second members in response to first and second drive signals, and having first and second capacitances defined between the first and second drive electrodes and their associated proof masses. A mismatch between the first capacitance and the second capacitance is measured. Drive feedthrough caused by the mismatch is nulled by compensating for the measured capacitance mismatch. The relative amplitudes of the first and second drive signals is adjusted in order to compensate for the measured capacitance mismatch.

BRIEF DESCRIPTION OF THE DRAWING

Other features and advantages of the present invention will be apparent from the following detailed description of the drawing in which.

DETAILED DESCRIPTION OF THE PREFERRED EMBODIMENT

Figure 1:
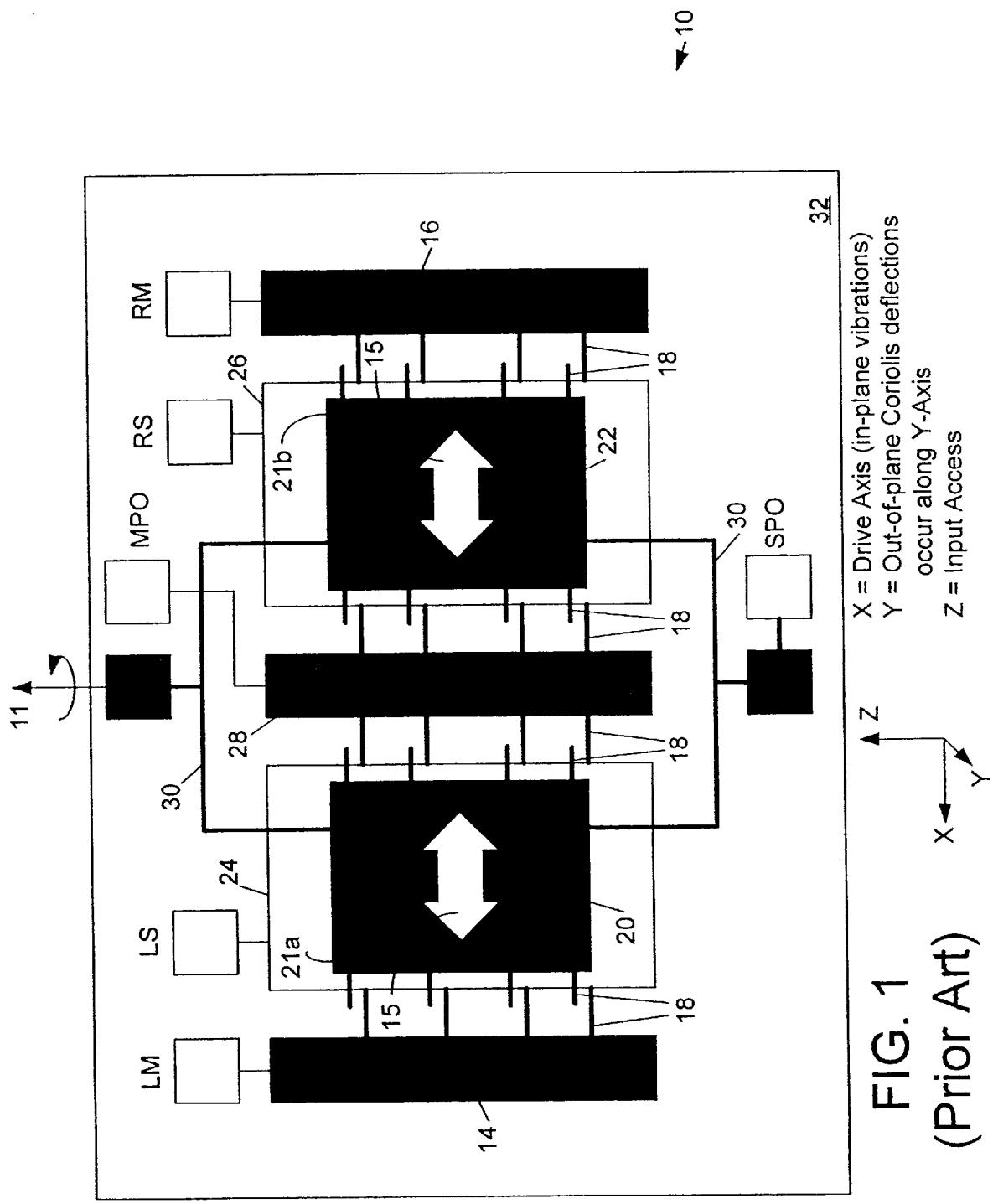
FIG. 1 is a perspective view of a prior art Coriolis sensor.

FIG. 1 illustrates a prior art sensor 10, such as a micromechanical tuning-fork gyroscope, for detecting a rotational rate about an input axis 11 of the sensor 10. The sensor 10 includes a substrate 32, and first 20 and second 22 proof masses positioned on opposite sides of the input axis 11. The proof masses 20 and 22 are flexurally coupled to the substrate 32 by means of support flexures 30. In one embodiment, the proof masses 20 and 22 are suspended by the flexures 30 above the substrate 32, so as to permit vibratory motion of the proof masses in-plane in a nominal plane including the input axis, as well as out-of-plane in a direction perpendicular to the nominal plane. The nominal plane may be parallel to the surface of the substrate 32. Each proof mass includes an electrically conductive region, shown as 21a and 21b, respectively.

The prior art sensor 10 includes a driver having first 14 and second 16 drive electrodes disposed opposite the electrically conductive regions 21a, 21b of the first 20 and second 22 proof masses. The sensor 10 also includes first 24 and second 26 out-of-plane sensing electrodes, and an in-plane position-sensitive pickoff electrode 28. In one embodiment, the in-plane pickoff electrode 28 is also suspended above the substrate 32 by the flexures 30, while the out-of-plane sensing electrodes 24 and 26 are disposed on the substrate 32.

In one embodiment, each proof mass has comb electrodes 18 extending laterally therefrom and toward an adjacent one of the drive electrodes. The drive electrodes 14, 16 have complementary comb electrodes 18 extending toward, and interleaved with, the comb electrodes 18 of the adjacent one of the proof masses 20 and 22. The drive electrodes 14 and 16 are electrostatically coupled to the proof masses 20 and 22, respectively, by the sets of interleaved comb electrodes 18. First and second capacitances $C_1$ and $C_2$ are thus defined between the first 14 and second 16 drive electrodes, and the first 20 and second 22 proof masses, respectively.

The first and second drive electrodes 14 and 16 are adapted to receive first and second a.c. opposite phase electrical drive signals which induce electrostatic forces between the sets of interleaved comb electrodes 18 between electrode 14 and proof mass 20 on the one hand and electrode 16 and proof mass 22 on the other. The drive signals typically are square waves. The drive electrodes convert the drive signal into an electrostatic Coulomb force signal proportional to the square of the drive signal, thereby electrostatically driving the proof masses to impart in-plane vibration to the proof masses in the nominal plane (in the directions shown by arrows 15).

In response to a rotation of the sensor 10 about the input axis 11, the proof masses deflect out of the plane of vibration. Such out-of-plane deflections of the proof masses 20, 22 occur because of the Coriolis forces that arise from the rotation around the input axis and act on the moving proof masses. The Coriolis force is given by:

$$\vec{F} = -2m\vec{\Omega} \times \vec{V} \qquad \text{Eq. 1}$$

where
m=mass of the proof mass,
$\vec{\Omega}$=angular velocity of the proof mass about the input axis,
$\vec{V}$=velocity of in-plane vibration of the proof mass, and
x denotes the vector cross-product.

Since the in-plane vibrations occur at a drive frequency, from Eq. 1 it follows that the out-of-plane deflections of the proof masses also occur at the drive frequency. The drive frequency is typically set to be substantially equal to the mechanical resonant frequency of the sensor, generally referred to as the fundamental frequency.

In order to maintain stable gyroscope performance, the vibratory amplitudes of the proof masses 20, 22 should be kept relatively constant. This is accomplished by monitoring the in-plane proof mass deflection with the position sensitive pick-off electrode 28. The pick-off electrode 28 produces an output signal which is indicative of the amplitude of the in-plane motion of the proof masses. The output signal from the pick-off electrode 28 is fed to a feedback gain control loop to control the amplitudes of the drive signals, and thus the amplitudes of the vibratory motion of the proof masses. The detection of in-plane deflection is susceptible, however, to errors from drive feedthrough.

First and second sensing electrodes 24, 26 are disposed on the substrate 32 for detecting the anti-parallel, out-of-plane Coriolis deflections of the proof masses 20 and 22. The amplitudes of the out-of-plane deflections are proportional to the input rotational rate, according to Eq. 1. The sensor output signals therefore provide a measure of the rotational rate $\vec{\Omega}$.

In one embodiment, capacitive sensing is used. In this embodiment, each out-of-plane sensing electrode is fixedly positioned with respect to the substrate 32, and is disposed below a conductive region (21a or 21b) of a respective one of the first 20 and second 22 proof masses. The capacitances between the sensing electrodes 24, 26 and the proof masses 20, 22 thus oscillate in accordance with the amplitudes of the out-of-plane Coriolis deflections. The sensing electrodes generate output signals that are proportional to the separation between the conductive regions 21a, 21b, and the associated sensing electrodes 24, 26, and hence are proportional to the amplitudes of the Coriolis deflections of the proof masses. The sensor output signals thus reflect the changes in the capacitances between the sensing electrodes and their associated proof masses, and vary according to the frequency of the out-of-plane oscillations.

A DC bias voltage $V_b$ is applied to the sensing electrodes 24, 26 to establish a potential difference. Because of the capacitances between the conductive regions 21a, 21b and the associated sensing electrodes, the sensing electrodes 24, 26 induce on each proof mass a charge that is proportional to the separation between the proof mass and its associated sense electrode. The changes in capacitance between the proof masses 20, 22 and their associated sensing electrodes 24, 26 thus result in changes in the charge on the proof masses 20, and 22, which are reflected in the sensor output signals.

The detection of the out-of-plane deflections is susceptible, however, to errors resulting from drive feedthrough into the sensor output signal. In particular, the sensor output signal is contaminated by capacitive coupling from the drive electrodes. Such capacitive coupling is caused by parasitic capacitances related to the fabrication and packaging of the sensor system. Drive feedthrough includes synchronous and asynchronous components. Synchronous drive feedthrough includes signals at the fundamental frequency and its harmonics. Asynchronous drive feedthrough includes all other signals originating at the drive electrodes. Synchronous feedthrough causes a direct instrument bias. Asynchronous feedthrough imposes gain limitations and limits desensitization of the sensor to DC offsets.

An off-frequency drive scheme for eliminating synchronous feedthrough is disclosed in prior art U.S. Pat. Nos. 5,481,914 and 5,703,292, both of which are incorporated herein by reference. In this scheme, the sensor 10 is connected in a feedback relationship with a frequency translation circuit. The input drive signal is converted into a feedback signal which is further processed to control the drive signal in a closed loop. The frequency translation circuit suppresses components of the feedback signal at the resonant frequency of the sensor, by effectively multiplying the feedback signal by a commutation signal. Any coupling of the drive signal into the sensor output signal is then readily removed by using conventional filtering techniques, since the drive signal now has a frequency different from the frequency of the sensor output signal. The frequency translation circuit thus substantially reduces synchronous feedthrough, i.e. in-band coupling of the drive signal into the feedback signal and into the sensor output signal. The off-frequency drive scheme summarized above still does not remove, however, asynchronous feedthrough.

The present invention provides a system for substantially reducing both synchronous and asynchronous feedthrough. It has been found that the dominant cause of drive feedthrough is a mismatch in the capacitances $C_1$ and $C_2$ between the drive electrodes 14, 16 and their associated proof masses 20, 22. The difference between $C_1$ and $C_2$, which should ideally be zero, is the main cause of drive feedthrough. The present invention compensates for variations in $C_1$ and $C_2$ by varying the drive voltages $V_1$ and $V_2$ so as to equalize the magnitudes of the charges $Q_1$ and $Q_2$ induced on the first and second proof masses by way of the drive voltages. The charges are related to the drive voltages by the relation Q=CV, where C is the associated capacitance, $C_1$ or $C_2$. By balancing out the charges induced on the proof masses, i.e. by rendering the charges equal and opposite, feedthrough of the drive signals into the sensor output signals is nulled. In the present invention, compensation for capacitance mismatch is accomplished by measuring one or more of the drive feedthrough components, and then nulling the measured components by adjusting the relative amplitudes of the drive signals $V_1$, $V_2$, as explained further below.

Figure 2A:
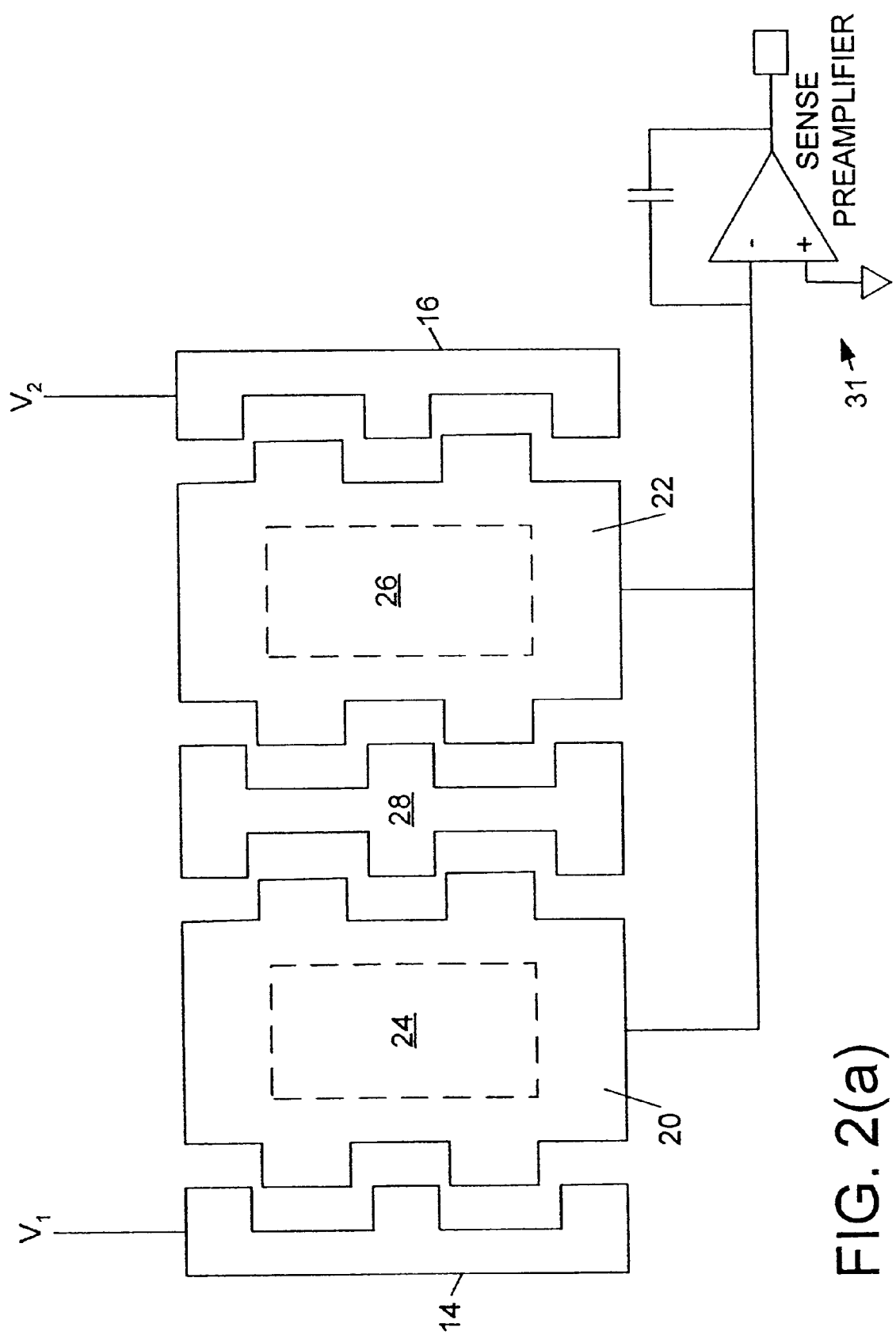
FIGS. 2(a) and 2(b) illustrate a drive coupling model for the sensor of FIG. 1.
Figure 2B:
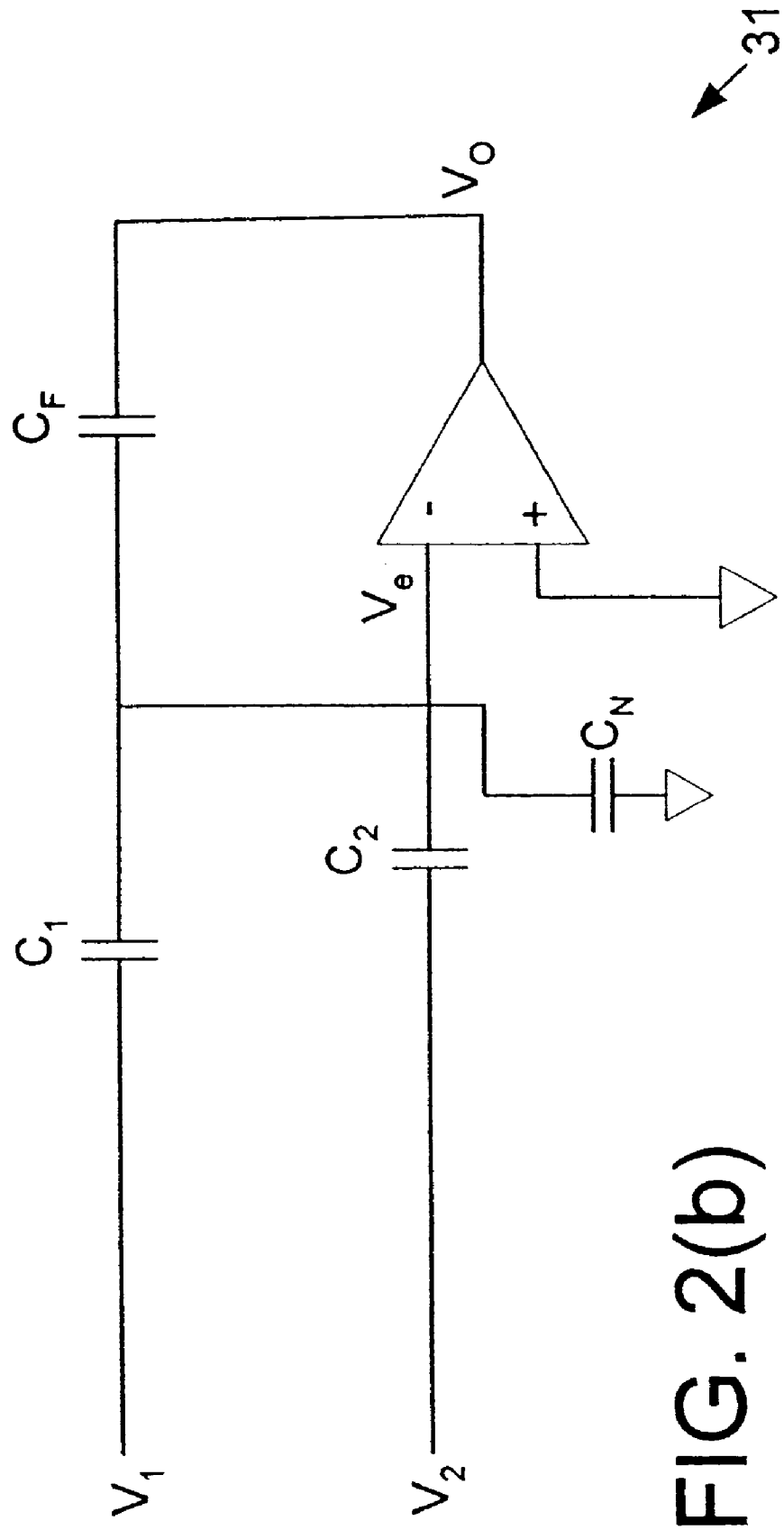

FIGS. 2(a) and 2(b) provides a circuit diagram of a drive coupling model for the sensor discussed above. In FIG. 2(a), a sense preamplifier 31 is shown connected to the proof masses 20 and 22. The proof masses are placed at a virtual ground of the sense preamplifier 31. A first $C_1$ and a second $C_2$ capacitance is defined between each drive electrode and the summing node of the sense preamplifier 31.

Referring to FIG. 2(b), the preamplifier output $V_o$ is given by:

$$V_o = -C_f^{-1}[V_1 C_1 + V_2 C_2] + V_e\left[1 + \left(\frac{C_1 + C_2 + C_N}{C_f}\right)\right] \qquad \text{Eq. 2}$$

where $V_e$ is the preamplifier input error voltage, which is generally small unless the input changes very rapidly, and the voltages and capacitances are as shown in FIG. 2(b). If the preamplifier bandwidth is made arbitrarily large, the error term becomes arbitrarily small, and the preamplifier output is simplified, becoming:

$$V_o = -C_f^{-1}[V_1 C_1 + V_2 C_2] = -C_f^{-1}[Q_1 + Q_2] \quad \text{Eq. 3}$$

where $Q_1$ and $Q_2$ represent the charge transferred to the summing node by $C_1$ and $C_2$, respectively. Drive feedthrough in the preamplifier output can thus be nulled by effecting a charge balance condition:

$$Q_1 = -Q_2 \quad \text{Eq. 4}$$

The charge balance condition can be alternatively expressed as:

$$\frac{V_1}{V_2} = \frac{-C_2}{C_1} \quad \text{Eq. 5}$$

Therefore, if $V_1$ and $V_2$ have opposite polarities and a magnitude ratio equal to the reciprocal of the ratio of the corresponding capacitors, drive feedthrough from static capacitance mismatch is nulled.

In the present invention, drive feedthrough can be measured and nulled in one of several embodiments. In order to measure drive feedthrough, a signal that is proportional to the drive capacitance mismatch must first be obtained. In one embodiment, a separate trace signal having a characteristic such as frequency different from the drive signals, can be obtained from a trace source and added to the drive signals. The trace signal is separately detected, and used to measure drive capacitance mismatch. In another embodiment in which the drive signal inherently contains components at off-frequencies, as in the off-frequency drive scheme discussed above, one or more of the inherent off-frequency components of the drive signal can be detected that are proportional to the capacitance mismatch. The detected off-frequency components are then demodulated in order to measure the capacitance mismatch. The measured capacitance mismatch is nulled by making a fixed adjustment to the differential drive voltages, or with an automatic feedback servo loop.

Figure 3:
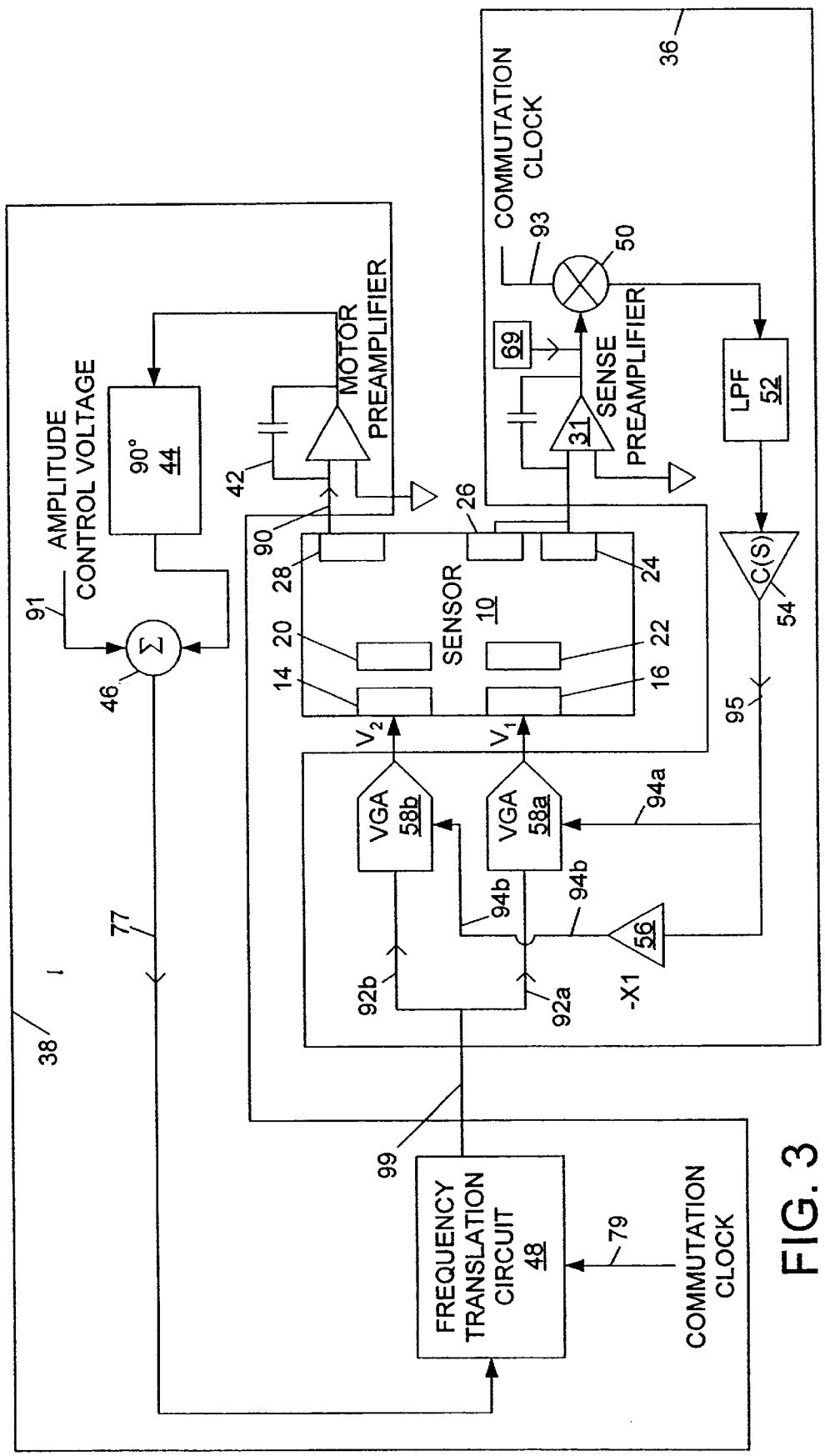
FIG. 3 is a diagram of an automatic drive feedthrough nulling system, in accordance with the present invention, for the sensor of FIG. 1.

FIG. 3 illustrates one embodiment of the present invention in which an off-frequency artifact of the drive signal, i.e. an inherent off-frequency component of the drive signal, is used to measure the capacitance mismatch. A nulling compensator 36 is used in conjunction with a feedback servo loop 38, to compensate for the measured capacitance mismatch. The nulling compensator 36 demodulates the off-frequency artifact to provide a measure of capacitance mismatch. Based on the measured capacitance mismatch, the differential amplitude of the drive signals $V_1$, $V_2$ is modified so as to effect the charge balance condition of Eq. 5, thereby substantially reducing drive feedthrough into the sensor output signal.

The capacitance mismatch between the drive electrodes 14, 16 and their associated proof masses 20, 22 is measured by detecting an off-frequency artifact of the drive signals $V_1$, $V_2$ at the output of the sense preamplifier 31, and demodulating the detected artifact. In one embodiment of the present invention, the form of the drive signals is described by the following equation:

$$V_D(t) = (B + A sq(\omega t)) sq\left(\frac{\omega t}{n}\right), n \text{ even} \quad \text{Eq. 6}$$

where $\omega$ is the fundamental frequency, and $sq(\omega t)$ is a zero-mean square-wave with amplitude=1 volt and period $2\pi/10^7$.

Because of mismatch in the time-average drive capacitance, a smaller version of the signal of Eq. 5 exists, along with other signals, at the preamplifier output. That is, the amplified preamplifier output is:

$$V_o(t) \approx K(B + A sq(\omega t)) sq\left(\frac{\omega t}{n}\right) + \text{other signals}, \quad \text{Eq. 7}$$

where the value of K is given by:

$$K = G_{AC}\left(\frac{\Delta C_D}{C_f}\right) \quad \text{Eq. 8}$$

in which $G_{AC}$ is the gain following the preamplification, and $\Delta C_D$ is the mismatch in the time-average drive capacitors.

The signal of Eq. 6 includes a significant term at frequency $\omega/n$. This term can be synchronously demodulated to yield a DC signal which is proportional to K, and thus proportional to the capacitance mismatch. The sense preamplifier output is multiplied by a square wave 93 of frequency $\omega/n$, in order to eliminate even harmonics of the basic subharmonic frequency $\omega/n$. The multiplied output is given by:

$$V_m(t) = K(B + A sq(\omega t)) sq^2\left(\frac{\omega t}{n}\right) = K(B + A sq(\omega t)) \quad \text{Eq. 9}$$

The modulation components can be filtered out by passing the signal of Eq. 9 through the low pass filter 52. The result is:

$$V_{LPF}(t) = KB = G_{AC}(\Delta C_D/C_f)B \quad \text{Eq. 10}$$

which is the desired DC signal that provides a measure of the capacitance mismatch. The capacitance mismatch is thus given by:

$$\Delta C_D = (C_f V_{LPF}(t)/B \, G_{AC}) \quad \text{Eq. 11}$$

In the illustrated embodiment, the feedthrough nulling compensator 36 is used in conjunction with a feedback gain control loop 38. The feedback gain control loop is operative to receive a signal 90 from the position sensitive pick off 28. The signal 90 is indicative of the amplitude of the in-plane displacement of the first 20 and the second 22 proof masses. The signal 90 is fed into a frequency translation circuit 48, which suppresses components at the fundamental frequency of the sensor 10. The frequency translation circuit outputs drive signals 92a and 92b for driving the proof masses of the sensor 10.

In one embodiment, the feedback control loop 38 includes a motor preamplifier 42, a shifter 44, a summer 46, and the frequency translation circuit 48. In one embodiment, the signal 90 is fed to the motor preamplifier 42, the output of which is shifted by ninety degrees in the shifter 44. The output signal from the shifter 44 is summed in the summer 46 with an amplitude control voltage 91. The output signal 77 from the summer 46 is fed to the frequency translation circuit, and multiplied by a commutation clock signal 79 in order to suppress components in the signal 77 at the resonant frequency of the sensor 10. The output 99 from the frequency translation circuit 48 is then split into first and second opposite phase drive signals 92a and 92b for driving the proof masses 20 and 22.

The output from the LPF 52 (Eq. 10), which is proportional to the capacitance mismatch, is integrated in the integral controller 54. The output signal from the integrated controller 54 is split into two signals, one of which is inverted in the amplifier 56. The split signals provide opposite-phase control signals 94a and 94b, which are used to control the VGAs 58a and 58b respectively, thus closing the automatic feedback servo loop. The common-mode gain of the VGAs, controlled by the drive signals 92a and 92b from the frequency translation circuit 48, remains constant.

The differential gain of the VGAs 58a and 58b is adjusted by the control signals 94a and 94b according to the measured capacitance mismatch. In response to the control signals 94a and 94b, the VGAs 58a and 58b adjust the ratio of the amplitudes of the first and second drive signals to be equal to the reciprocal of the ratio of the first $C_1$ and second $C_2$ capacitances. The charge balance condition of Eq. 4 and Eq. 5 is thus achieved, so that drive feedthrough in the sense preamplifier output is automatically and continuously nulled. The magnitude adjusted drive signals $V_1$ and $V_2$, shown in FIG. 3, are delivered to the drive electrodes 14 and 16 through the VGAs 58a and 58b.

It will be noted that the techniques described above have general applicability. Many forms of drive feedthrough can be nulled using the techniques described above. It should therefore be understood that the invention is not limited to the particular embodiment shown and described herein, and that various changes and modifications may be made without departing from the spirit and scope of this concept as defined by the following claims.

What is claimed is:

1. A system for nulling feedthrough error in the output of a sensor caused by feedthrough of one or more drive signals into said sensor output, the system comprising:
   (a) a source of a drive signal, and a further signal having characteristics different from the drive signal, the drive signal and the further signal being applied to drive the sensor, wherein the further signal can be detected separately from the drive signal;
   (b) means for detecting a response of the sensor to said drive signal and said further signal applied thereto; and
   (c) means, responsive to components of the further signal in the detected response, for adjusting the drive signal so as to diminish the feedthrough error.

2. A system according to claim 1, wherein said means for adjusting the drive signal is responsive to a controller.

3. A system according to claim 2, wherein said means for adjusting the drive signal includes a feedback servo loop.

4. A system according to claim 1, wherein said sensor includes at least two drive electrodes having associated drive capacitances and being adapted to receive equal and opposite-phase drive signals.

5. A system according to claim 4, wherein said feedthrough error is caused at least in part by a mismatch between said at least two drive capacitances.

6. A system according to claim 5, wherein said further signal provides a measure of said capacitance mismatch.

* * * * *